United States Patent [19]
Lee et al.

[11] Patent Number: 5,671,232
[45] Date of Patent: Sep. 23, 1997

[54] SECOND HARMONIC GENERATION METHOD AND APPARATUS

[75] Inventors: Hang-woo Lee, Kunpo; Sang-hak Lee, Seoul; Joseph Kilwhoan Chee, Songtan; Young-mo Hwang, Seoul, all of Rep. of Korea; Yurij V. Tsvetkov, Moscow, U.S.S.R.; Alexander V. Semenenko, Moscow, U.S.S.R.; Ivan I. Kuratev, Moscow, U.S.S.R.

[73] Assignee: Samsung Electronics Co., Ltd., Kyungki-do, Rep. of Korea

[21] Appl. No.: 520,392

[22] Filed: Aug. 29, 1995

[30] Foreign Application Priority Data

May 7, 1995 [KR] Rep. of Korea .................. 95-11290

[51] Int. Cl.$^6$ .................................................. H01S 3/10
[52] U.S. Cl. .................................. 372/22; 372/27; 372/29
[58] Field of Search ................................ 372/22, 27, 29, 372/32, 34, 38

[56] References Cited

U.S. PATENT DOCUMENTS

| | | |
|---|---|---|
| 3,858,056 | 12/1974 | Melamed et al. .................. 307/88.3 |
| 4,413,342 | 11/1983 | Cohen et al. . |
| 5,093,832 | 3/1992 | Bethune et al. . |
| 5,377,212 | 12/1994 | Tatsuno et al. .................. 372/22 |
| 5,384,796 | 1/1995 | Jee .................................. 372/22 |
| 5,495,489 | 2/1996 | Lee et al. ........................ 372/22 |

*Primary Examiner*—Akm E. Ullah
*Assistant Examiner*—Robert E. Wise
*Attorney, Agent, or Firm*—Rothwell, Figg, Ernst & Kurz, P.C.

[57] ABSTRACT

A second harmonic generation apparatus provides a polarization element transmitting only light polarized in an extra-ordinary axis direction on the proceeding path of a second harmonic emitted from a resonator. The light polarized in the extra-ordinary axis direction is transmitted to a beam splitter, and a part of the polarized light is fed back to a feedback circuit, so that the temperature of a non-linear birefringent crystalline element inside resonator can be stably controlled and the output second harmonic can be stably produced.

6 Claims, 3 Drawing Sheets

SECOND HARMONIC GENERATION METHOD AND APPARATUS

BACKGROUND OF THE INVENTION

The present invention relates to a second harmonic generation method and apparatus, and more particularly, to a second harmonic generation method and apparatus capable of stabilizing an output.

In a recording or reproducing system used in an audio/video system such as a laser disk player, or an information recording device such as an optical magnetic drive, a laser having a linearly polarized stable output is required. Generally, the amplitude of an output laser beam can be stabilized easily by adjusting the input current of the laser diode, i.e., a light source, by the feedback control structure of the laser output. The output of an optically amplifying solid-state laser system can be stabilized by controlling the laser output and amplification ratio. A laser device including harmonic generating process by a non-linear birefringent crystalline material needs a complex feedback control structure.

A laser-diode-pumped second harmonic generator emitting the light of a blue-green spectral range is a very useful light source for high density magneto-optical recording. However, the second harmonic generation device in which a frequency doubling non-linear birefringent crystalline material is provided inside an internal resonator, is a laser device having a characteristic problem in that the amplitude of the output is unstable. As a result, there has been much research on second harmonic generating methods and the stabilization of second harmonic output.

Phase matching is a prerequisite for the effective and stable generation of the second harmonic. Technology capable of realizing effective second harmonic generation of low output was proposed in U.S. Pat. Nos. 4,413,342 and 5,093,832. The former proposed a frequency doubling method of an internal resonator type. Here, the laser resonator includes one pair of mirrors on which a coating layer of high reflectivity to the fundamental wave is provided. In this method, effective second harmonic generation can be realized with minimal loss by providing a non-linear birefringent crystalline material for frequency doubling inside the resonator into which the high strength fundamental wave is injected. In the latter patent (U.S. Pat. No. 5,093,832), resonance occurs inside the external frequency doubling birefringent crystalline material, and second harmonic generation can be effectively realized by reinforcement of the fundamental wave in a resonator having such a structure. Here, the temperature of the frequency doubling non-linear birefringent crystalline material is controlled through a feedback control loop of the second harmonic.

Another temperature control method is shown in U.S. Pat. No. 3,858,056. In this method, the output of the laser separated by a beam splitter can be measured with a photo detector placed in the feedback control loop. In such a structure, although the second harmonic output has a maximum value at the correct temperature, an error signal is generated. The error signal does not indicate in which direction to adjust the temperature of the non-linear birefringent crystalline material. Accordingly, such a temperature control method is difficult to apply because of the ambiguity of the error signal.

Another problem is that the error signal generated from the second harmonic divided by a beam splitter is not sensitive to the polarization change of the second harmonic. That is, since the beam splitter has different reflectivities with respect to s-polarization and p-polarization, although a feedback circuit operates properly, it is difficult to stabilize the output of the second harmonic when a polarization of the second harmonic changes.

In the laser system in which the state of polarization is a variable parameter, temperature control for stabilizing the output is required to be executed independent of the polarization state of the second harmonic.

SUMMARY OF THE INVENTION

It is an object of the present invention to provide a second harmonic generation method and apparatus capable of stabilizing an output effectively.

To accomplish the above object, there is provided a second harmonic generation method comprising the steps of: generating a fundamental wave by exciting a birefringent crystalline gain medium with a pumping laser; generating a second harmonic by exciting a non-linear birefringent crystalline element with said fundamental wave; selecting and transmitting a specific polarized light of said second harmonic; separating a part of said specific polarized light and feeding said part back to a control circuit; converting the feedback light into an electrical signal; and controlling the temperature of said non-linear birefringent crystalline element with said electrical signal.

Also, to accomplish the above object, there is provided second harmonic generation apparatus including: a resonator provided with an input mirror and an output mirror; a non-linear birefringent crystalline element and a gain medium provided on the optical axis inside the resonator; a temperature control device controlling the temperature of the non-linear birefringent crystalline element; a beam splitter placed on the proceeding path of the second harmonic transmitted by the output mirror, and reflecting part of the second harmonic onto an other path; a polarization element provided in between the output mirror and the beam splitter, and transmitting light polarized in a specific direction; an optical detector provided on the proceeding path of the reflected beam of the second harmonic reflected by the beam splitter; and a control circuit controlling a temperature control device with the signal emitted from the optical detector.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In a second harmonic generation method of the present invention, Nd:YAG which is one kind of a solid state laser pumped by a laser diode is provided on a laser generation optical axis located inside a resonator. Two mirrors having a high reflectivity against a fundamental wave and a birefringent crystalline gain medium are provided in the resonator. The fundamental wave is produced by exciting the birefringent crystalline gain medium by injecting the pumping laser output into the resonator, a second harmonic is produced from the fundamental wave by the non-linear birefringent crystalline material located on the optical axis. A polarization element such as a Brewster plate converting the fundamental wave into linearly polarized light is located in between the gain medium and the non-linear birefringent crystalline material. The non-linear birefringent crystalline element for frequency doubling is type II phase-matched and its temperature is controlled by a thermoelectric cooling element using the Peltier effect. The output of the second harmonic has a polarization component close to the extra-ordinary axis of the frequency doubling non-linear birefringent crystalline element. According to experiment, it was confirmed that the second harmonic was not precisely linearly polarized, because the polarization nature disappears when the polarized light passes through the frequency doubling non-linear birefringent crystalline element. Also it was confirmed that the degree of depolarization differed according to the temperature.

Type I and II phase matching conditions are explained as follows.

Figure 1A:
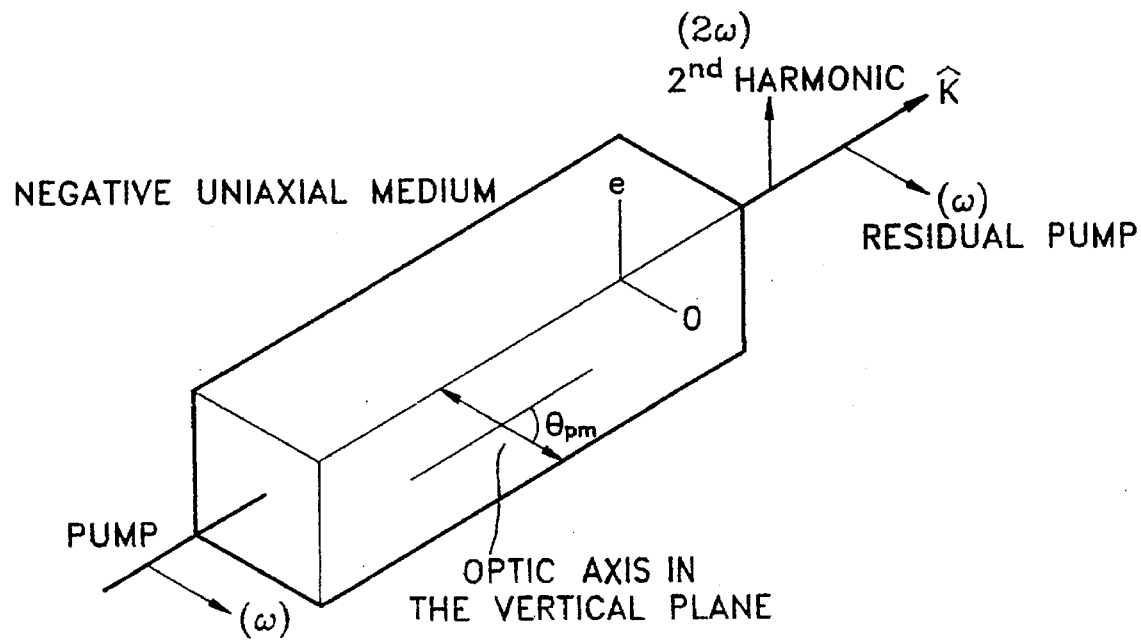
FIG. 1A is a drawing for illustrating type I phase matching in the second harmonic generator in a negative uniaxial medium.

In type I phase matching condition, both the linearly polarized pump and second harmonic wave propagate in the same direction $\hat{K}$ that makes an angle $\theta_{pm}$ (the phase matching angle) with the optical axis. For a negative uniaxial medium, $$n_o^{(w)} = n_e^{(2w)}(\theta_{pm})$$

i.e., the pump beam is an ordinary wave and the second harmonic is an extraordinary wave, both propagating in the direction $\hat{K}$ at the same velocity (phase). The experimental schematic is given in FIG. 1A. The medium is cut so that $\theta_{pm}$ can be easily aligned. For a positive uniaxial medium, $$n_o^{(2w)} = n_e^{(w)}(\theta_{pm})$$

i.e., the pump beam is an extraordinary wave and the second harmonic is an ordinary wave, both propagating in the direction $\hat{K}$ at the same velocity (in phase). The angle $\theta_{pm}$ for a positive uniaxial crystal is given by the following equation.

$$\sin^2\theta_{pm} = \{[n_o^{(2w)}]^{-2} - [n_o^{(w)}]^{-2}\}/\{[n_e^{(w)}]^{-2} - [n_o^{(w)}]^{-2}\}$$

Figure 1B:
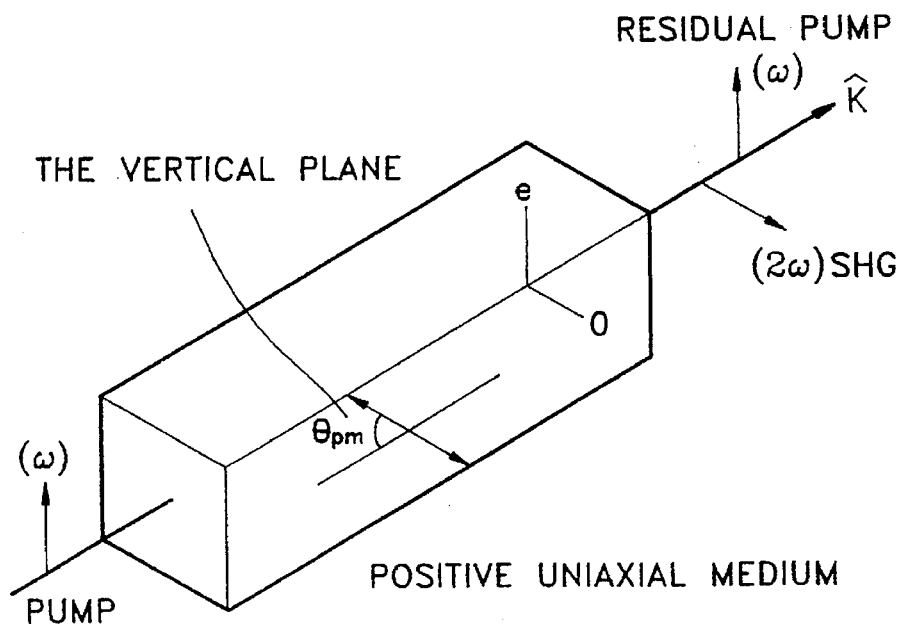
FIG. 1B is a drawing for illustrating type I phase matching in the second harmonic generator in a positive uniaxial medium.

The experimental schematic is shown in FIG. 1B.

In type II phase matching condition, two pump beams with orthogonal linear polarizations are used; one is an ordinary wave, the other is an extraordinary wave. The generated second harmonic is an extraordinary wave. All the waves propagate in the same direction $\hat{K}$ making an angle $\theta_{pm}$ with respect to the optical axis and the following equation has to be satisfied.

$$n_e^{(2w)}(\theta_{pm}) = [n_o^{(w)} + n_e^{(w)}(\theta_{pm})]/2$$

Figure 2:
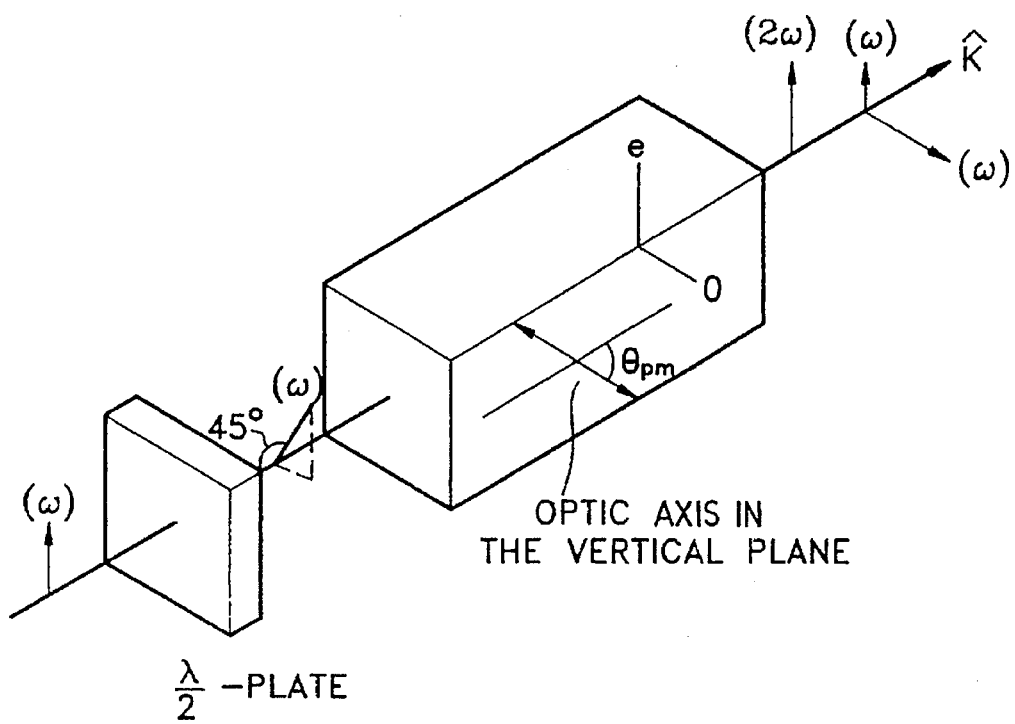
FIG. 2 is a drawing for illustrating one practical way for type II phase matching in the second harmonic generator in a uniaxial crystal.

This means that the "mean" velocity of the combined pump waves is equal to the velocity of the second harmonic wave. FIG. 2 shows one practical way of phase matching starting from one pump beam. The pump beam first passes through a half-wave plate so that the incident linearly (vertically) polarized pump beam becomes polarized at 45° with respect to the vertical axis (e-axis in the crystal). In entering the second harmonic medium, the incident wave is decomposed into the ordinary and extraordinary waves. These two waves, thus, satisfy the condition of two pump beams. The output has three waves, of which two pump waves (here, phase-shifted with each other) and the second harmonic waves are vertically polarized. The two pump waves are combined to form a resultant wave of elliptical polarization, in general.

The fundamental wave is removed from the second harmonic emitted from the resonator by providing a filter in front of the output mirror of the resonator. Also, the second harmonic is divided into two paths by providing a beam splitter on the proceeding path of the second harmonic.

The reflected second harmonic separated and reflected by the beam splitter is electrically detected by providing a photo detector on the proceeding path of the beam, and the photo detector transfers the detected electrical signal to a feedback circuit controlling the thermoelectric cooling element.

When the second harmonic mentioned above is linearly polarized perfectly, there is no problem in the temperature control of the frequency doubling non-linear birefringent element. In practice, however, the error quantity of the signal sent to the feedback circuit can be more than 10% according to the degree of depolarization. Accordingly, another beam splitter is provided in front of the photo detector in order to solve such problems in the present invention.

Figure 3:
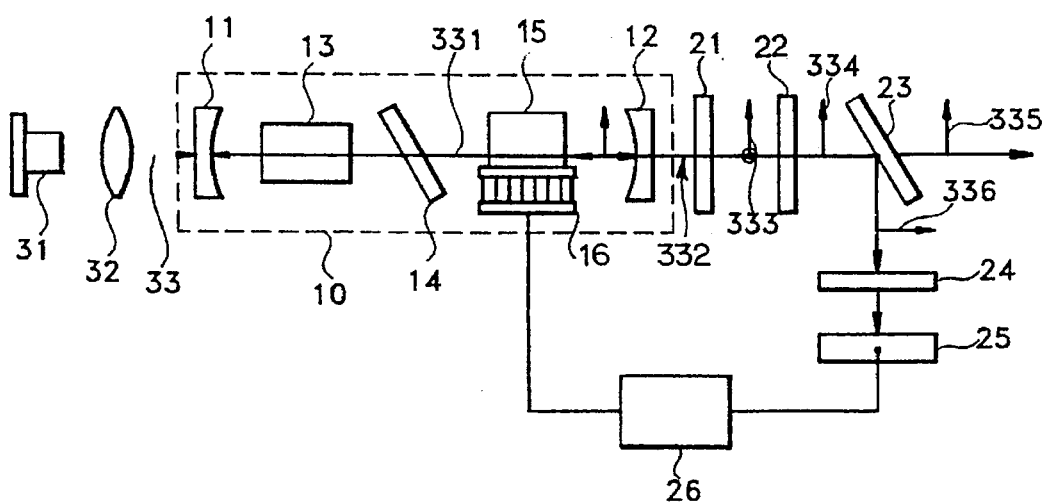
FIG. 3 is a schematic of a second harmonic generation apparatus according to the present invention.

In FIG. 3, reference symbol 10 denotes a resonator, 31 denotes a light source (e.g., a laser diode), and 32 denotes a focusing lens focusing light from the light source into the resonator. Resonator 10 includes an input mirror 11 and an output mirror 12 on which coating layers of high reflectivity are provided respectively. A gain medium 13 (e.g., Nd:YAG), a Brewster plate 14 which is a polarization element, and a non-linear birefringent crystalline element 15 (e.g., KTiOPO$_4$) are located sequentially on the optical axis located inside the resonator. Non-linear birefringent crystalline element 15 is placed on a Peltier element 16, a thermoelectric cooler, for controlling the temperature. A first filter 21 filtering the fundamental wave, a polarization element 22 transmitting the specific polarization component of the harmonic, and a beam splitter 23 reflecting part of the incident second harmonic toward an optical detector 25 are provided on the optical axis in front of output mirror 12. An photo detector 25 is provided on the proceeding path of the reflected light from beam splitter 23, and a second filter 24 is provided in between beam splitter 23 and optical detector 25.

If a pumping laser 33 emitted from a light source 31 is injected into resonator 10 and is absorbed into gain medium 13, a fundamental wave is generated from gain medium 13. When input mirror 11 and output mirror 12 are arranged properly, maximum resonance against the fundamental wave is realized. The fundamental wave is transmitted through Brewster plate 14 and becomes polarized beam 331. As the polarized beam 331 passes through frequency doubling non-linear birefringent element 15, a second harmonic 332 is generated and is emitted through output mirror 12. At this time, a part of the fundamental wave is included in the second harmonic and is filtered out by first filter 21.

In a second harmonic generation apparatus according to the present invention, a type II phase matching method is applied to the frequency doubling non-linear birefringent crystalline element 15 in order to generate the second harmonic. The incident surface of Brewster plate 14 is tilted 45° with respect to the extra-ordinary axis of the frequency doubling non-linear birefringent crystalline element 15.

Second harmonic 332 is generated along the extra-ordinary axis of frequency doubling non-linear birefringent crystalline element. Since light polarized in other directions except the extra-ordinary axis is removed as a second harmonic 333 passes through and polarization element 22, second harmonic 333 is converted to a pure second harmonic 334 having the component directed the same as the extra-ordinary axis direction. Second harmonic 334 is transmitted to beam splitter 23, and is divided into two paths. Second harmonic 335 transmitted through beam splitter 23 is the output laser actually used, and reflected second harmonic 335 becomes the source of the feedback control circuit of the thermoelectric cooling element. Namely, only the specific wave length of second harmonic 336 is passed through second filter 24 to a photo detector 25 so that a current signal corresponding to the intensity of the incident second harmonic is generated. The current generated from photo detector 25 is transferred to a cooling device control circuit 26, and the Peltier element 16 is controlled according to the amount of the current.

According to the structure as set forth above, since all polarization components with the exception of the specific polarization component of the extra-ordinary axis direction are removed by polarization element 22 placed in between first filter 21 and beam splitter 23, stable control of the second harmonic is achieved. The feedback circuit is operated properly and optimized by a temperature error signal, the temperature error signal is minimized, and the final second harmonic is stabilized.

The control of such a stable second harmonic is based on the following theory.

Figure 4:
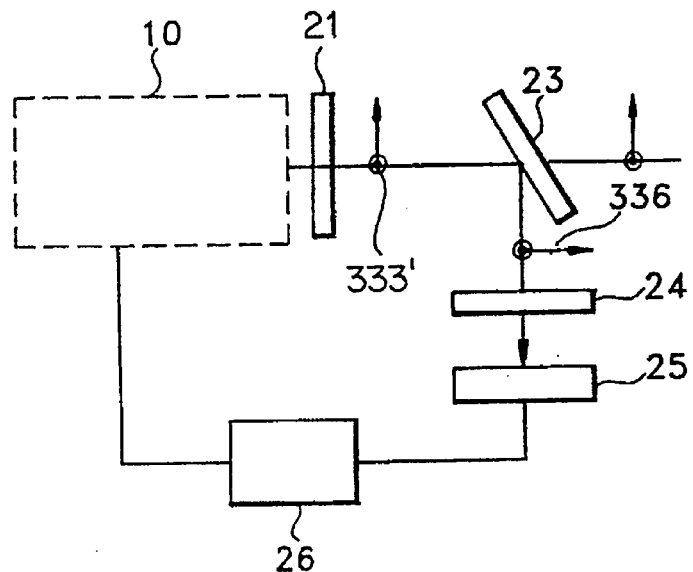
FIG. 4 is an extracted schematic of a conventional feedback control structure for explaining the present invention.

The fact that the degree of disappearance of polarization of the second harmonic by the non-linear birefringent crystalline element depends on the temperature is worth noting. This fact is proved clearly by a simple theoretical consideration. The extracted feedback structure and second output in a conventional second harmonic generation method is shown in FIG. 4 in order to compare with the second harmonic generation method of the present invention in theory. Each symbol used is the same as the corresponding element of the present invention for the sake of convenience.

In the feedback structure of FIG. 4, a second harmonic 333' is a beam in which polarized light has disappeared. Namely, in the case of the conventional structure in which there is no polarization element in front of the first filter, the second harmonic passing through the first filter has no polarized light, that is to say, all components in the extra-ordinary axis direction and other directions are mixed together. Part of second harmonic 333' is reflected from beam splitter 23 and feed back, and the remainder is output for use.

If the output of the component of the extra-ordinary axis direction is $p^e$ and the output of other directions is $p^o$ for a theoretical explanation, the output of each component of the second harmonic transmitted by the beam splitter and each component of the reflected second harmonic are $$P^e_{fb} = R_{\|} P^e \qquad (1)$$

$$P^o_{fb} = R_{\perp} P^o \qquad (2)$$

$$P^e_{us} = (1-R_{\|}) P^e \qquad (3)$$

$$P^o_{us} = (1-R_{\perp}) P^o \qquad (4)$$

where $P^e_{fb}$ is the output of the component of the extra-ordinary axis of the reflected second harmonic $P^o_{fb}$ is the output of the component of other directions in the reflected beam, $P^e_{us}$ is the output of the component of the extra-ordinary axis direction among the transmitted beam, $P^o_{us}$ is the output of the component of other directions in the transmitted beam. The overall output of the reflected second harmonic $P_{fb}$ is the sum of equations (1) and (2), and the overall output of the transmitted second harmonic $P_{us}$ is the sum of equations (3) and (4).

An important parameter K can be defined as the ratio of $P_{fb}$ and $P_{us}$ as follows.

$$K = \frac{P_{us}}{P_{fb}} \qquad (5\text{-}1)$$

$$= \frac{P^e_{us} + P^o_{us}}{P^e_{fb} + P^o_{fb}} \qquad (5\text{-}2)$$

$$= \frac{P^e(1-R_{\|}) + P^o(1-R_{\perp})}{R_{\|}P^e + R_{\perp}P^o} \qquad (5\text{-}3)$$

Since $P_{fb}$ is the output measured in optical detector 25 in order to generate a normal temperature error signal, $P_{fb}$ should be a constant. If K is a constant, $P_{us}$ should be a constant, too. However, in fact, since K might not be a constant due to the change of the output $p^o$ generated by the disappearance polarization, $P_{us}$ may not be a constant. This also means that the output of the second harmonic may not be stabilized.

However, in the present invention, since polarization element 22 is provided in between first filter 21 and beam splitter 23, the polarization component of other directions except the extra-ordinary axis direction is removed by polarization element 22 before second harmonic 333 is radiated to beam splitter 23 as explained hereinabove.

Figure 5:
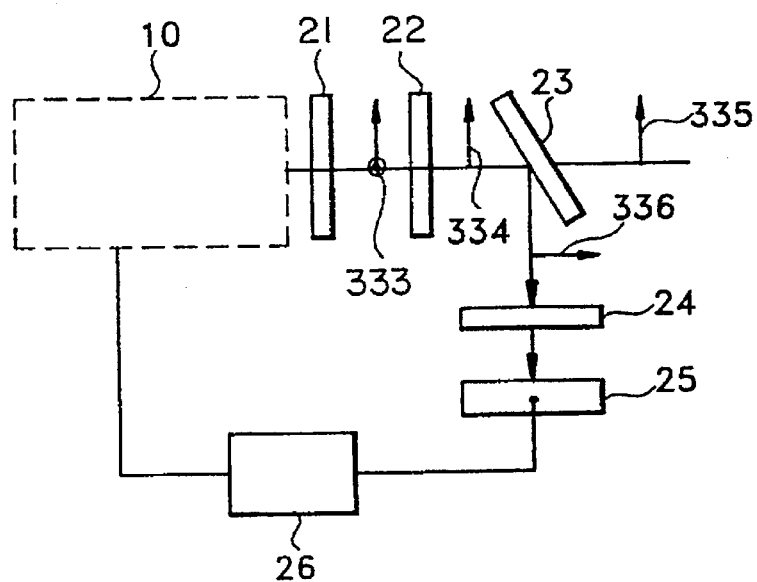
FIG. 5 is a schematic of the feedback control structure of the second harmonic generation apparatus according to the present invention.

The feedback structure of the output of the second harmonic extracted from the apparatus of the present invention shown in FIG. 3 is shown in FIG. 5 in order to compare easily with the conventional structure of FIG. 4.

In FIG. 5, the reference numbers 335 and 336 denote the second harmonic having only the polarization component of the extra-ordinary axis direction. If the reflected second harmonic 336 and the transmitted second harmonic 335 are denoted as $P'_{fb}$ and $P'_{us}$ respectively, following equations are obtained.

$$P^e_{fb}{}' = R_{\|} P^e \qquad (6)$$

$$P^e_{us}{}' = (1-R_{\|}) P^e \qquad (7)$$

In equations (6) and (7), $P^e$, $P^e_{fb}{}'$ and $P^e_{us}{}'$ have the polarization component in the same direction.

Here K' is defined as the ratio of $P^e_{us}{}'$ to $P^e_{fb}{}'$.

$$K' = \frac{P^e_{us}{}'}{P^e_{fb}{}'} \qquad (8\text{-}1)$$

$$= \frac{P^e(1-R_{\|})}{R_{\|}P^e} \qquad (8\text{-}2)$$

$$= \frac{1-R_{\|}}{R_{\|}} \qquad (8\text{-}3)$$

In equation (8-3), K' has a constant value which has nothing to do with the disappearance of polarization, but is a function of the reflectivity of the beam splitter. As above, since K' is a constant, as long as $P^e_{fb}{}'$ is maintained uniformly in the feedback circuit, $P^e_{us}{}'$ becomes a constant. Consequently, the actual output $P^e_{us}{}'$ is stable.

Here, comparing equation (5-3) with equation (8-3), K in equation (5-3) is a function of $P^e$ and $P^o$ and is not a constant. Therefore, although $P_{fb}$ is maintained uniformly in the feedback circuit, the output $P_{us}$ is not uniform. On the other hand, as described hereinabove, equation (8-3) is a resultant equation when polarization element 22 is added, and K' is not a function of $P^e$ and $P^o$, and is a constant. Therefore, since $P_{fb}$ is maintained uniformly in the feedback circuit, the output $P_{us}$ is maintained uniformly.

In the operation of the apparatus of the present invention, since the second harmonic passing through the first filter and sent to the feedback circuit passes through a polarization element before transmitted to the beam splitter and the polarized components which are in different direction from the extra-ordinary axis direction and act as the error in the feedback circuit is removed.

The stabilization of the output which was a big problem in the conventional second harmonic generation method is greatly improved by the method of the present invention as above.

What is claimed is:

1. A method for generating a second harmonic, which comprises the steps of:

generating a fundamental wave by exciting a birefringent crystalline gain medium with a pumping laser;

generating a second harmonic by exciting a non-linear birefringent crystalline element with said fundamental wave;

polarizing said second harmonic and transmitting a specific polarized light of said second harmonic;

separating a part of said polarized light and feeding said part back to a control circuit;

converting the feedback light into an electrical signal; and controlling the temperature of said non-linear birefringent crystalline element with said electrical signal.

2. A method for generating a second harmonic according to claim 1, wherein the step of separating a part of said polarized light and feeding said part back to a control circuit is performed by a beam splitter.

3. A method for generating a second harmonic according to claim 1, wherein the step of polarizing said second harmonic and transmitting the polarized light of said second harmonic is performed by a polarization element.

4. A method for generating a second harmonic according to claim 1, wherein the step of polarizing said second harmonic and transmitting the polarized light of said second harmonic further comprises the step of polarizing only the light polarized in the extra-ordinary axis direction.

5. A second harmonic generation apparatus comprising:

a resonator provided with an input mirror and an output mirror;

a non-linear birefringent crystalline element and a gain medium provided on an optical axis placed in said resonator;

a temperature control device controlling the temperature of said non-linear birefringent crystalline element;

a beam splitter provided on the path of the second harmonic transmitted from said output mirror, and reflecting part of the second harmonic to an other path;

a polarization element provided in between the output mirror and said beam splitter, and transmitting the light polarized in a specific direction;

an optical detector provided on a path of said second harmonic reflected by said beam splitter; and a control circuit controlling said temperature control device with the signal emitted from said optical detector.

6. A second harmonic generation apparatus according to claim 5, wherein said polarization element has a polarization axis transmitting only the light polarized in the extra-ordinary axis direction.

* * * * *

UNITED STATES PATENT AND TRADEMARK OFFICE
CERTIFICATE OF CORRECTION

PATENT NO. : 5,671,232
DATED : September 23, 1997
INVENTOR(S) : Hang-woo Lee et al.

It is certified that error appears in the above-identified patent and that said Letters Patent is hereby corrected as shown below:

Col. 1, line 19, insert -- a -- before "harmonic"; Col. 6, line 20, "p°" should be -- P° --.

Signed and Sealed this

Twenty-fourth Day of February, 1998

Attest:

BRUCE LEHMAN

Attesting Officer     Commissioner of Patents and Trademarks